United States Patent
Oryoji et al.

(10) Patent No.: US 10,280,855 B2
(45) Date of Patent: May 7, 2019

(54) CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Kazuhiro Oryoji, Tokyo (JP); Yoshihiko Akagi, Hitachinaka (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 0 days.

(21) Appl. No.: 15/528,970

(22) PCT Filed: Oct. 28, 2015

(86) PCT No.: PCT/JP2015/080307
§ 371 (c)(1),
(2) Date: May 23, 2017

(87) PCT Pub. No.: WO2016/084538
PCT Pub. Date: Jun. 2, 2016

(65) Prior Publication Data
US 2017/0268442 A1    Sep. 21, 2017

(30) Foreign Application Priority Data
Nov. 28, 2014  (JP) ................. 2014-240729

(51) Int. Cl.
*F02D 41/02*    (2006.01)
*F02D 45/00*    (2006.01)
(Continued)

(52) U.S. Cl.
CPC ........... *F02D 41/025* (2013.01); *F02D 21/08* (2013.01); *F02D 41/005* (2013.01);
(Continued)

(58) Field of Classification Search
CPC ......... F02D 41/025; F02D 21/08; F02D 43/00
See application file for complete search history.

(56) References Cited

U.S. PATENT DOCUMENTS

| 6,062,204 A | 5/2000 | Cullen |
| 2011/0139133 A1 | 6/2011 | Surnilla et al. |

(Continued)

FOREIGN PATENT DOCUMENTS

| FR | 2938301 A1 | 5/2010 |
| JP | 2009-024685 A | 2/2009 |

(Continued)

OTHER PUBLICATIONS

Extended European Search Report issued in corresponding application No. 15 86 2692.9 dated Jun. 5, 2018.

*Primary Examiner* — Stephen K Cronin
*Assistant Examiner* — Xiao En Mo
(74) *Attorney, Agent, or Firm* — Foley & Lardner LLP

(57) ABSTRACT

An internal combustion engine control device equipped with air cylinders and an EGR mechanism that returns exhaust gas emitted from the air cylinders to the intake side of the air cylinders is provided. The internal combustion engine control device includes an EGR control unit that controls the EGR flow volume of the EGR mechanism, and a humidity detection unit that directly or indirectly detects the humidity of outside air supplied to the air cylinders. The EGR control unit calculates the moisture amount in the outside air and the moisture amount in the recirculated exhaust gas, and controls the EGR mechanism on the basis of: a stable combustion limit air cylinder mass, which is set in accordance with the combustion state in the air cylinders; the mass of the air introduced into the air cylinders; the mass of the fuel; and the moisture amounts.

8 Claims, 14 Drawing Sheets

(51) Int. Cl.

| | | |
|---|---|---|
| *F02D 21/08* | (2006.01) | |
| *F02D 41/06* | (2006.01) | |
| *F02D 41/00* | (2006.01) | |
| *F02D 43/00* | (2006.01) | |
| *F02M 26/05* | (2016.01) | |
| *F02M 26/28* | (2016.01) | |
| *F02M 26/00* | (2016.01) | |

(52) U.S. Cl.
CPC ........... *F02D 41/064* (2013.01); *F02D 45/00* (2013.01); *F02D 43/00* (2013.01); *F02D 2200/0418* (2013.01); *F02M 26/05* (2016.02); *F02M 26/28* (2016.02); *F02M 2026/003* (2016.02); *Y02T 10/47* (2013.01)

(56) References Cited

U.S. PATENT DOCUMENTS

| | | |
|---|---|---|
| 2011/0270511 A1 | 11/2011 | Kurtz |
| 2012/0316753 A1 | 12/2012 | Rumpsa et al. |
| 2013/0218438 A1 | 8/2013 | Surnilla et al. |
| 2014/0100760 A1 | 4/2014 | Yi et al. |
| 2014/0109568 A1 | 4/2014 | Glugla et al. |
| 2015/0047340 A1* | 2/2015 | Ulrey ..................... F02B 47/08 60/600 |

FOREIGN PATENT DOCUMENTS

| | | |
|---|---|---|
| JP | 2010-090806 A | 4/2010 |
| JP | 2011-001853 A | 1/2011 |
| JP | 2012-132364 A | 7/2012 |

\* cited by examiner

CONTROL DEVICE FOR INTERNAL COMBUSTION ENGINE

TECHNICAL FIELD

The present invention relates to an engine control device.

BACKGROUND ART

Engines incorporating a mechanism for recirculating an exhaust gas in an intake side to reduce fuel consumption of automobiles (EGR: Exhaust Gas Recirculation) have been introduced in the market. The aim of recirculating the exhaust gas is to reduce any power that the piston works (pumping loss) by reducing a manifold vacuum pressure (the difference between a cylinder internal pressure during an intake stroke and the ambient pressure) under the condition that the engine output power is small and to reduce the exhaust loss by suppressing abnormal combustion (knocking) under the condition that the engine output power is relatively large.

In order to remove a pumping loss under the condition that the engine output power is small, it is desired to recirculate the exhaust gas until the intake pipe pressure reaches the ambient pressure. However, since the exhaust gas basically serves as an inert gas, it is known that a flame propagation rate is reduced as the recirculating exhaust gas increases. In addition, if the recirculating exhaust gas amount reaches a certain level, the combustion becomes unstable. For this reason, there is an upper limitation determined under the condition of recirculating exhaust gas amount by which combustion stability can be secured (the combustion stabilization limitation mass). This upper limitation defines the recirculating exhaust gas amount considering and satisfying the combustion stability different depending on an engine type or a driving condition.

Meanwhile, the moisture of the air also serves as an inert gas similar to the exhaust gas to reduce the flame propagation rate. For this reason, if the recirculating exhaust gas amount is determined without considering moisture of the air, the engine combustion state becomes unstable depending on a humidity condition, and it may be difficult to obtain desired performance. As a technique for such problems, an internal combustion engine control device is discussed in PTL 1. This internal combustion engine control device computes a moisture amount of the fresh air on the basis of the detected humidity (relative humidity) and the fresh air target amount introduced into the engine cylinder and performs correction for reducing the exhaust gas amount as the moisture amount of the fresh air increases depending on the computed value.

CITATION LIST

Patent Literature

PTL 1: JP 2011-001853 A

SUMMARY OF INVENTION

Technical Problem

The technique discussed in PTL 1 is a technique capable of securing combustion stability and maximizing reduction of the pumping loss by computing a moisture amount of the fresh air and reducing the exhaust gas amount as the moisture amount computed on the basis of the computed moisture amount increases.

However, in practice, each component of a gas mixture of the fresh air and the exhaust gas (mainly carbon dioxide, nitrogen, and water) has a different influence on the combustion state. In the technique of PTL 1, the moisture of the exhaust gas is not detected. Therefore, since it is difficult to consider a difference of the influence of each chemical species on the combustion state, it is difficult to suitably set the recirculating exhaust gas amount depending on a condition and it may be possible to generate combustion instability.

In view of the aforementioned problems, the present invention provides an internal combustion engine control device capable of more stabilizing the combustion state by suitably setting the recirculating exhaust gas amount.

Solution to Problem

The present invention is an internal combustion engine control device that controls an internal combustion engine provided with a cylinder and an EGR mechanism configured to return an exhaust gas discharged from the cylinder to an intake side of the cylinder, the internal combustion engine control device including: an EGR control unit configured to control an EGR flow rate of the EGR mechanism; and a humidity detection unit configured to directly or indirectly detect humidity of an ambient air supplied to the cylinder, wherein the EGR control unit computes a moisture amount of the ambient air and a moisture amount of the recirculating exhaust gas and controls the EGR mechanism on the basis of a stable combustion limitation cylinder mass set depending on a combustion state of the cylinder, a mass of the air introduced into the cylinder, and a mass of fuel and the moisture amount.

Advantageous Effects of Invention

According to the present invention, it is possible to provide an internal combustion engine control device capable of more stabilizing the combustion state by suitably setting the recirculating exhaust gas amount.

DESCRIPTION OF EMBODIMENTS

Figure 1:
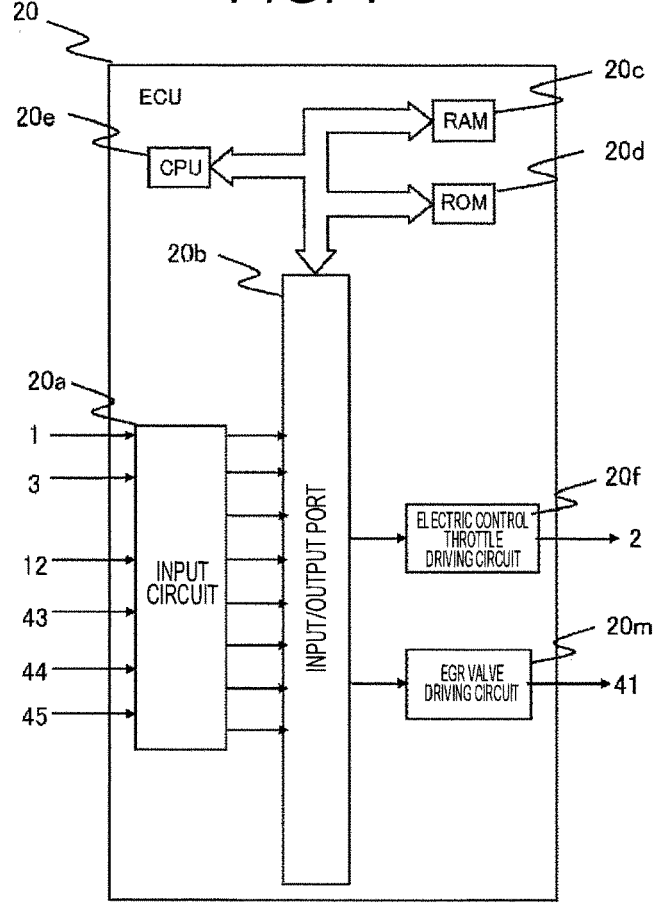
FIG. 1 is a system block diagram illustrating a configuration of an engine control device according to an embodiment of the present invention.

In order to achieve the aforementioned objectives, an internal combustion engine control device according to an embodiment of the present invention computes fresh air introduced into the engine cylinder and a moisture amount of the recirculating exhaust gas on the basis of a moisture amount of the fresh air directly or indirectly detected and controls an exhaust gas amount on the basis of the computation value to avoid unstable combustion caused by an excessive recirculating exhaust gas amount. In this configuration, it is possible to determine the exhaust gas amount considering compositions of the exhaust gas and the gas input to the engine cylinder. It is possible to reduce a pumping loss as much as possible and implement maximization of low fuel consumption without allowing humidity to degrade combustion stability.

If the moisture amount of the fresh air is directly detected, and the detected moisture amount is applied to a computation value of the recirculating exhaust gas amount to control the recirculating exhaust gas amount, it is possible to directly detect an absolute value of the moisture amount of the fresh air and accurately compute and control a setting value of the recirculating exhaust gas amount.

In addition, this internal combustion engine control device changes a combustion stabilization limitation depending on a change of the moisture amount introduced into the cylinder. As a result, the recirculating exhaust gas amount can be adjusted considering influence on combustion stability caused by water and other components (such as nitrogen or carbon dioxide). Therefore, it is possible to maximize reduction of the fuel consumption by reducing a pumping loss while avoiding unstable combustion caused by a change of the combustion stabilization limitation.

Meanwhile, if a gas is recirculated in a low-pressure exhaust gas recirculation (EGR) system, the exhaust gas amount recirculated in the cylinder is changed depending on an activation state of a catalyst. Under an inactive state of the catalyst, more radicals exist in the exhaust gas, compared to the active state of the catalyst, and the combustion is easily stabilized. According to the present invention, a control of the recirculating exhaust gas can be performed considering a change of the composition of the exhaust gas changed depending on the activation state of the catalyst. Therefore, it is possible to increase the fuel consumption reduction amount using more conditions.

If the exhaust gas is recirculated in a high-pressure EGR system, the control is performed such that the amount of the recirculating exhaust gas increases under the condition of a high water temperature. If the water temperature is low, a temperature of the recirculating exhaust gas decreases. In contrast, if the water temperature is high, the temperature of the recirculating exhaust gas increases. If the temperature of the recirculating exhaust gas is low, a combustion rate is easily delayed. Therefore, in order to secure the combustion stability, it is necessary to reduce the recirculating exhaust gas amount, compared to the condition of the high water temperature. According to the present invention, the recirculating exhaust gas can be controlled by distinguishing between a case of the low water temperature and a case of the high water temperature. Therefore, it is possible to maximize low fuel consumption depending on the water temperature.

If the internal combustion engine is provided with both the high-pressure EGR system and the low-pressure EGR system, and the high-pressure EGR system is employed, the recirculating exhaust gas amount is controlled to increase, compared to a case where the low-pressure EGR system is employed. Since the exhaust gas recirculated in the high-pressure EGR system does not pass through the catalyst, the exhaust gas contains more active chemical species, compared to the exhaust gas recirculated in the low-pressure EGR system. Therefore, a delay of the combustion rate does not easily occur in the exhaust gas recirculated in the high-pressure EGR system. As a result, a large amount of the gas recirculated in the high-pressure EGR system can be introduced under the condition of the same combustion stability, compared to the gas recirculated in the low-pressure EGR system. According to the present invention, it is possible to maximize a fuel consumption reducible range when each EGR system is employed.

Embodiments of the present invention will now be described with reference to the accompanying drawings. First, a configuration common to the following Examples will be described with reference to FIGS. 1 to 3.

FIG. 1 is a system block diagram illustrating a configuration of the engine control device. Output signals of an air flow sensor 1, a humidity sensor 3, an accelerator opening level sensor 12, a differential pressure sensor 43, an EGR temperature sensor 44, and a coolant temperature sensor (not illustrated) are input to an input circuit 20a of the ECU 20. However, the input signals are not limited to those described above. The input signals received from each sensor are transmitted to an input port of the input/output port 20b. The value transmitted to the input port 20b is stored in a RAM 20c and is processed by the CPU 20e. A control program that describes contents of the computation process is written on a ROM 20d in advance.

A value indicating the actuation amount of each actuator computed on the basis of the control program is stored in the RAM 20c. Then, the value is transmitted to each output port of the input/output port 20b and is output to each actuator through each driving circuit. According to this embodiment, the driving circuit includes an electronic throttle driving circuit 20f and an EGR valve driving circuit 20m. Each circuit controls the electronic control throttle 2 and the EGR valve 41. According to this embodiment, the driving circuit is provided in the ECU 20. However, the present invention is not limited thereto. Instead, any one of the driving circuits may be provided in the ECU 20.

The ECU 20 estimates the EGR percentage on the basis of the input signal and controls the throttle valve 2 and the EGR valve 41 depending on a required driving condition.

Figure 2:
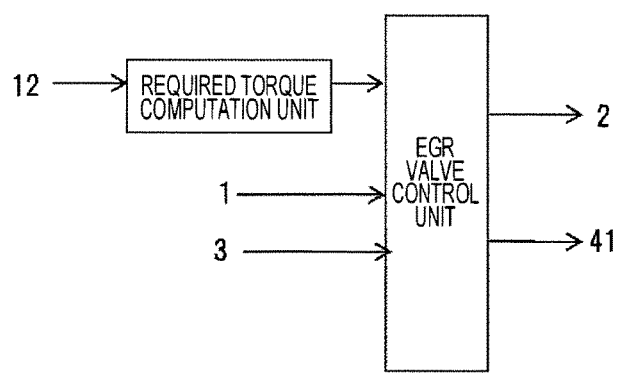
FIG. 2 is a schematic logic diagram illustrating a humidity-based exhaust gas recirculation (EGR) amount control performed by the ECU of the engine control device according to an embodiment of the invention.

FIG. 2 is a schematic logic diagram illustrating a control for the reduced and discharged exhaust gas performed in the ECU 20 of the engine control device. The exhaust gas control logic includes a required torque computation unit that computes a required torque and a required air amount on the basis of the output of the accelerator opening level sensor 12, and an EGR valve control unit that computes a control amount of the EGR valve on the basis of a fresh air moisture amount and an exhaust gas moisture amount computed from the output of the air flow sensor 1 and the output of the humidity sensor 3, and the required air amount. The accelerator opening level sensor 12 is input to the required torque computation unit, and the air flow sensor signal 1 and the humidity sensor signal 3 are input to the EGR valve control unit, so that the control for the EGR valve 41 and the throttle valve is performed.

Figure 3:
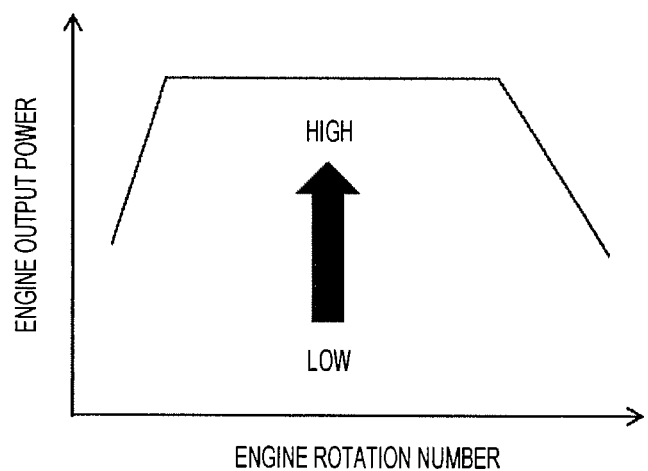
FIG. 3 is a conceptual diagram illustrating engine map data regarding a combustion stabilization limitation mass according to an embodiment of the invention.

FIG. 3 is a map which previously defines a stable combustion limitation mass on an engine map. As the engine output power increases from a low output power region, the stable combustion limitation mass tends to increase. Here, according to this embodiment, it is assumed that the map of the stable combustion limitation mass is established at an ambient air temperature Tamb and a relative humidity of 100%. This is because, if the relative humidity is defined as 100%, it is possible to drive the engine without generating combustion instability under any humidity condition. Note that the stable combustion limitation mass may be an in-cylinder mass that generates combustion instability under each driving condition, or a mass that minimizes the fuel consumption under each driving condition. Alternatively, a single map may be defined by mixing such definitions.

Figure 4:
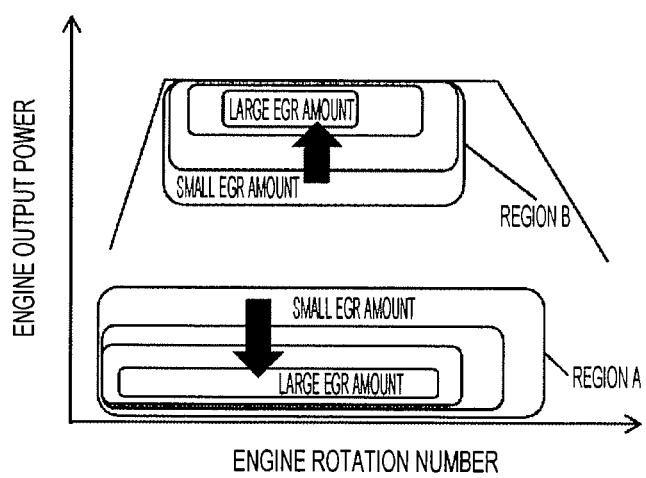
FIG. 4 is a conceptual diagram illustrating engine map data regarding an EGR amount according to Example 1.

FIG. 4 is a map which previously defines the EGR amount on the engine map. In the small engine output power region (Region A), the EGR is introduced in order to reduce a pumping loss, such that the required EGR amount increases as the engine output power decreases. In addition, in the large engine output power region (Region B), the EGR is introduced in order to suppress abnormal combustion, such that EGR amount tends to increase as the engine output power increases. Here, in Example 1, it is assumed that the map is created at the ambient air temperature Tamb and a relative humidity of 100%. This is because, if the EGR amount is appropriately set at a relative humidity of 100%, it is possible to drive the engine without generating combustion instability under any humidity condition.

EXAMPLE 1

Figure 5:
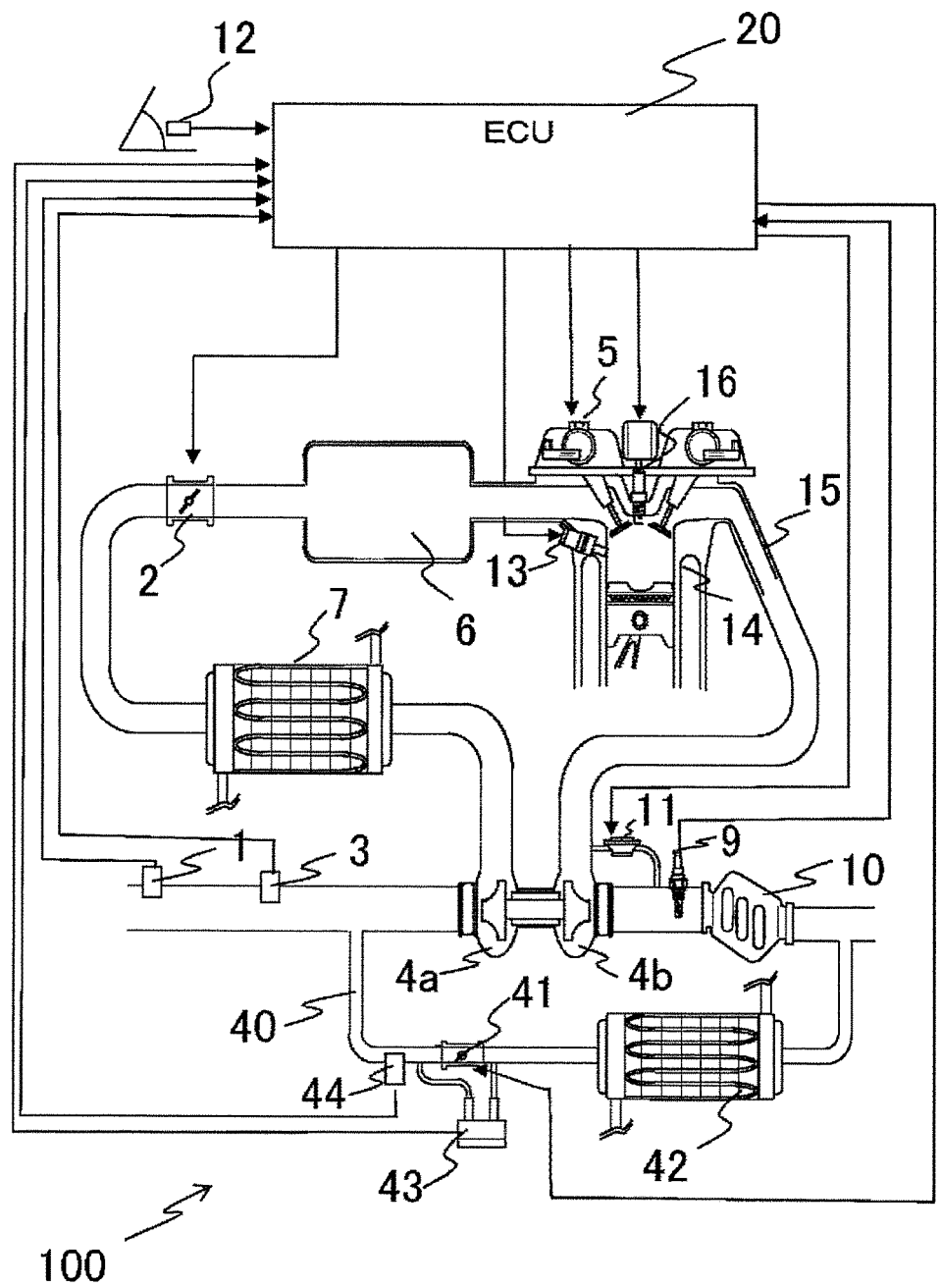
FIG. 5 is a schematic system diagram illustrating an engine control device according to Example 1.

Example 1 will now be described. FIG. 5 is a schematic system diagram illustrating an automobile in-cylinder injection type gasoline engine provided with a low-pressure EGR flow passage.

The engine 100 is an automobile gasoline engine that performs spark ignition type combustion. An air flow sensor 1 that measures an intake air amount, a humidity sensor 3 that detects an intake humidity, a supercharger compressor 4a for supercharging the intake air, an intercooler 7 for cooling the intake air, and an electronic control throttle 2 that adjusts the intake pipe pressure are provided in respective suitable positions of the intake pipe. Here, the humidity sensor 3 is a sensor capable of detecting a relative humidity and an absolute humidity. In addition, each cylinder of the engine 100 is provided with a fuel injection device (hereinafter, referred to as an "injector") 13 that injects fuel to the inside of the cylinder 14 and an ignition plug 16 that supplies ignition energy. In addition, a variable valve 5 that adjusts the gas injected into the cylinder or discharged from the cylinder is provided in a cylinder head. The intake air amount of overall cylinders and the internal EGR amount are controlled by adjusting the variable valve 5. In addition, although not illustrated in the drawings, a high-pressure fuel pump for supplying high-pressure fuel to the fuel injection device 13 is connected to the fuel injection device 13 through a fuel pipe, and the fuel pipe is provided with a fuel pressure sensor for measuring the fuel injection pressure.

A turbine 4b for exerting a rotation force to the supercharger compressor 4a on the basis of the exhaust energy, an electronic control wastegate valve 11 for adjusting an exhaust flow rate flowing to the turbine, a three-way catalyst 10 that purifies the exhaust gas, and an air/fuel ratio sensor 9 as a sort of the air/fuel ratio detector that detects an air/fuel ratio of the exhaust gas in the upstream side of the three-way catalyst 10 are provided in respective suitable positions of the exhaust pipe 15.

An EGR pipe 40 for recirculating the exhaust gas to the upstream side of the compressor 4a of the intake pipe from the downstream side of the catalyst 10 of the exhaust pipe is provided. In addition, an EGR cooler 42 for cooling the EGR, an EGR valve (EGR mechanism) 41 for controlling the EGR flow rate, a differential pressure sensor 43 that detects a differential pressure around the EGR valve, and an EGR temperature sensor 44 that detects the EGR temperature are provided in respective suitable positions of the EGR pipe 40. Moreover, although not illustrated in the drawings, a temperature sensor 45 that measures a temperature of the coolant circulating the engine is provided.

The signals obtained from the air flow sensor 1, the humidity sensor 3, the air/fuel ratio sensor 9, the differential pressure sensor 43, and the EGR temperature sensor 44 are transmitted to an engine control unit (ECU) 20. In addition, the signal obtained from the accelerator opening level sensor 12 is transmitted to the ECU 20. The accelerator opening level sensor 12 detects a depression amount of the accelerator pedal, that is, an accelerator opening level. The ECU 20 computes the required torque on the basis of the output signal of the accelerator opening level sensor 12. That is, the accelerator opening level sensor 12 is used as a required torque detection sensor for detecting a torque required in the engine. Furthermore, the ECU 20 computes an engine rotation speed on the basis of the output signal of a crank angle sensor. The ECU 20 computes optimum values of major engine operation amounts such as the air flow rate, the fuel injection amount, the ignition timing, and the fuel pressure on the basis of the engine driving state obtained from various sensor output values.

The fuel injection amount computed by the ECU 20 is converted into a valve open pulse signal, which is transmitted to the injector 13. In addition, the ignition signal is transmitted to the ignition plug 17 such that the ignition is performed at the ignition timing computed by the ECU 20. Furthermore, the throttle opening level computed by the ECU 20 is transmitted to the electronic control throttle 2 as a throttle driving signal. Moreover, the EGR valve opening level computed by the ECU 20 is transmitted to the EGR valve 41 as an EGR valve opening level driving signal.

Fuel is injected to the air flowing from the intake pipe into the cylinder 14 through the intake value to form a gas mixture. The gas mixture is exploded by a spark generated from the ignition plug 16 at a predetermined ignition timing, so that its combustion pressure presses down the piston to obtain an engine driving force. In addition, the exhaust gas subjected to explosion passes through the exhaust pipe 15 and is transferred to the three-way catalyst 10, and the exhaust component is purified in the three-way catalyst 10 and is discharged to the outside. Since the three-way catalyst 10 is provided upstream of the inlet port of the EGR pipe 40, it is possible to stabilize a composition of the recirculating exhaust gas. As a result, it is possible to stably obtain performance in the EGR amount control under any driving condition.

Figure 6:
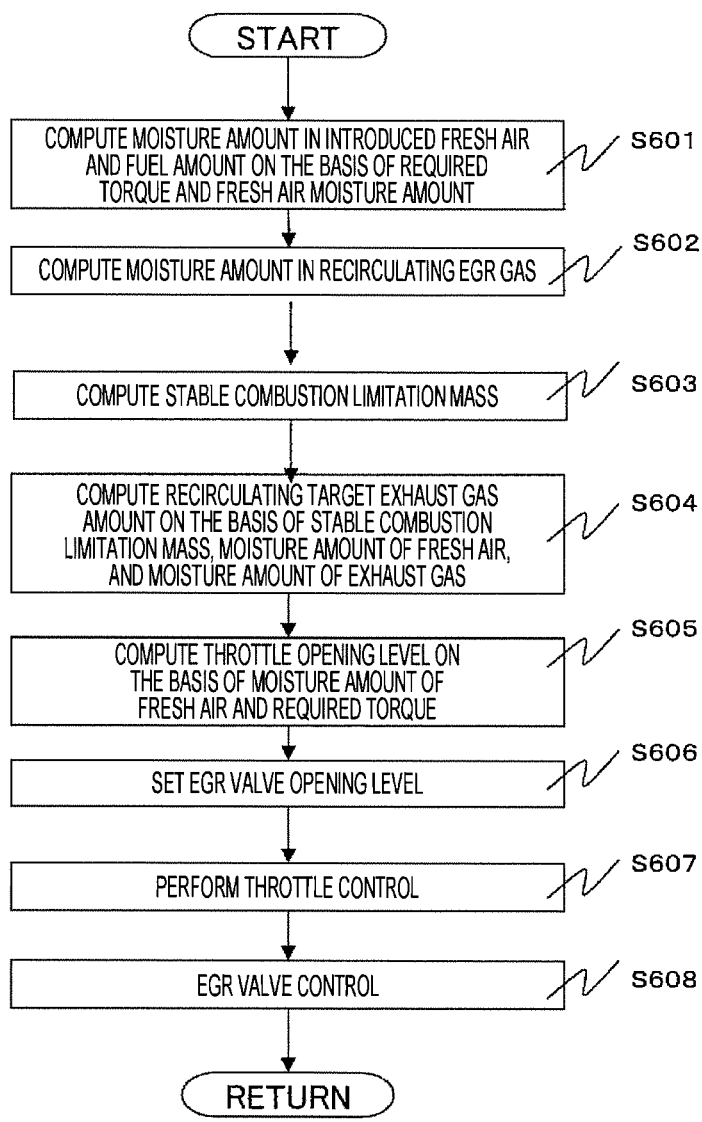
FIG. 6 is a flowchart illustrating a moisture amount-based EGR amount control of the engine control device according to Example 1.

FIG. 6 illustrates a computation process performed by the EGR valve control unit of FIG. 2.

First, in step S601, the moisture amount in the fresh air introduced into the cylinder is computed. First, a mass fraction of the moisture $Y_{H2O,air}$ and a volume fraction $\alpha$ of the air are computed from an absolute humidity $H_{air}$ [kg/m³] and an air density $\rho_{air}$ [kg/m³] detected from the output of the humidity sensor as described below, and the air density is recorded on the ECU. Alternatively, the values described above are estimated from the detected information.

$$Y_{H2O,air} = \frac{H_{air}}{H_{air} + \rho_{air}} \quad \text{(Equation 1-1)}$$

$$\alpha = \frac{\frac{H_{air}}{W_{H2O}}}{\frac{H_{air}}{W_{H2O}} + \frac{\rho_{air}}{W_{air}}} \quad \text{(Equation 2-1)}$$

Here, $W_{H2O}$ and $W_{air}$ denote a molar mass [kg/mol] of water and a molar mass of air [kg/mol], respectively.

Next, the moisture flow rate in the fresh air and the fresh air proportion of the moisture amount introduced into the cylinder are computed as follows on the basis of the output $m_{air}$ [kg/s] of the air flow sensor 1 or the required air amount $M_{air,R}$ [kg/cycle] obtained by the required torque computation unit.

Moisture flow rate of fresh air:

$$m_{H_2O,air} = Y_{H_2O,air} m_{air}, \quad \text{(Equation 3-1)}$$

or $$m_{H_2O,air} = \frac{Y_{H_2O,air} M_{air,R}}{1 - Y_{H_2O,air}} \frac{Ne}{30}. \quad \text{(Equation 3-2)}$$

Moisture amount introduced into cylinder:

$$M_{H_2O,air} = Y_{H_2O,air} m_{air} \frac{30}{Ne} \quad \text{(Equation 4-1)}$$

or $$M_{H_2O,air} = \frac{Y_{H_2O,air} M_{air,R}}{1 - Y_{H_2O,air}}. \quad \text{(Equation 4-2)}$$

Here, "Ne" denotes an engine rotation number [rpm]. While the moisture can be indirectly detected as described below, it may contain many estimation errors. For this reason, by detecting an absolute value of the moisture amount from the humidity sensor, it is possible to compute the moisture amount with high accuracy and accurately set various control signals of the actuator, compared to a case where the moisture amount is indirectly detected.

If the humidity sensor 3 is not installed, substitution may be possible by indirectly detecting the humidity. For example, the moisture amount flowing to the cylinder can be indirectly detected on the basis of a difference between the air amount computed from the output $m_{air}$ of the air flow sensor 1 during traveling at a constant torque and the required air amount $M_{air,R}$ as follows.

$$M_{H_2O,air} = m_{air} \frac{30}{Ne} - M_{air,R} \quad \text{(Equation 3-3)}$$

Here, the mass fraction $Y_{H2O,air}$ and the volume fraction $\alpha$ can be estimated as follows.

$$Y_{H_2O,air} = \frac{m_{air} \frac{30}{Ne} - M_{air,R}}{m_{air} \frac{30}{Ne}} \quad \text{(Equation 1-2)}$$

$$\alpha = \frac{m_{air} \frac{30}{Ne} - M_{air,R}}{m_{air} \frac{30}{Ne}} \frac{W_{air}}{W_{H_2O}} \quad \text{(Equation 2-2)}$$

In addition, the fuel mass $M_{Fuel}$ is computed on the basis of $M_{air,R}$, $m_{air}$ or as follows.

$$M_{Fuel} = CM_{air,R}$$

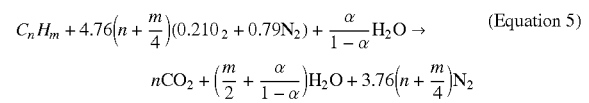

Here, "C" denotes a predetermined constant which is set to approximately "1/15" when combustion is performed at an ideal air/fuel ratio.

Next, in step S602, the moisture amount of the recirculating exhaust gas is computed. In computation of the moisture amount of the exhaust gas, an updated value of the detected moisture amount of the air is used. Here, assuming that the fuel molecule has a composition of "CnHm," the air is a gas mixture containing nitrogen (79 vol %) and oxygen (21 vol %), perfect combustion is performed to generate water and carbon dioxide, and nitrogen remains without reaction, the following relationship is established around the reaction.

$$C_nH_m + 4.76\left(n + \frac{m}{4}\right)(0.21O_2 + 0.79N_2) + \frac{\alpha}{1-\alpha}H_2O \rightarrow \quad \text{(Equation 5)}$$
$$nCO_2 + \left(\frac{m}{2} + \frac{\alpha}{1-\alpha}\right)H_2O + 3.76\left(n + \frac{m}{4}\right)N_2$$

Here, the left side refers to a cylinder state prior to the combustion, and the right side refers to a cylinder state subjected to the combustion. Here, "CnHm" denotes a fuel molecule, "O2" denotes an oxygen molecule, "N2" denotes a nitrogen molecule, "CO2" denotes a carbon dioxide molecule, "H2O" denotes a water molecule, "m" denotes an average carbon number of the hydrocarbon molecule included in the fuel, and "n" denotes an average carbon number of the hydrocarbon molecule included in the fuel. In this relationship, the moisture amount of the recirculating exhaust gas is computed as follows.

$$\beta = \frac{\left(\frac{m}{2} + \frac{\alpha}{1-\alpha}\right)W_{H_2O}}{nW_{CO_2} + \left(\frac{m}{2} + \frac{\alpha}{1-\alpha}\right)W_{H_2O} + 3.76\left(n + \frac{m}{4}\right)W_{N_2}} \quad \text{(Equation 6)}$$

Here, "WH2O," "WCO2," and "WN2" denote molar masses [kg/mol] of water, carbon dioxide, and nitrogen, respectively.

Next, in step S603, the stable combustion limitation mass is computed. The stable combustion limitation mass $M_{max, map}$ value may be extracted from the stable combustion limitation mass map of FIG. 3 depending on a driving condition. Alternatively, the EGR amount $M_{EGR, map}$ may be read from the EGR gas amount map of FIG. 4 depending on the current driving condition, and computation may be performed by applying Equation 7. The factor "γ" is a coefficient set by assuming that carbon dioxide or nitrogen of γ kg and water of 1 kg equally affect the combustion stability and is determined on the basis of experimental measurement.

$$M_{max,map} = (1-\beta+\gamma\beta)M_{EGR,map} + \gamma M_{H_2O,air,100\%} + M_{air} + M_{fuel} \quad \text{(Equation 7)}$$

Here, "$M_{air}$" is the air amount that can be obtained as follows.

$$M_{air} = (1 - Y_{H_2O,air})m_{air}\frac{30}{Ne} \quad \text{(Equation 8-1)}$$

or $$M_{air} = M_{air,R} \quad \text{(Equation 8-2)}$$

In step S604, the recirculating exhaust gas amount is computed considering the moisture amount finally introduced into the cylinder.

With regard to the computation method, a relationship with the stable combustion limitation mass will be described. In gasoline engines, combustion occurs by flam propagation. However, the influence on the flame propagation is different between carbon dioxide and water. For example, a reduction amount of the flame propagation rate is different between a case where water having a mass ratio of 10% as a dilution gas is added to a gas mixture of fuel and air having an equivalent ratio of "1" and a case where carbon dioxide having a mass ratio of 10% is added as a dilution gas. Combustion instability occurring in the engine when the exhaust gas is recirculated means that influence on combustion instability is different between water and carbon dioxide due to reduction of the flame propagation rate. In the following description, it is assumed that carbon dioxide or nitrogen of γ kg and water of 1 kg equally affect the combustion stability. The effective gas mass $M_{limit}$ of the cylinder is given in the following equation under the condition that the EGR gas amount gradually increases, and combustion is unstable.

$$M_{limit} = M_{CO_2,EGR} + M_{N_2,EGR} + \gamma(M_{H_2O,air} + M_{H_2O,EGR}) + M_{fuel} + M_{air} \quad \text{(Equation 9)}$$

Here, "$M_{EGR}$" denotes the recirculating exhaust gas amount. Equation 9 can be substituted with Equation 10 by applying the factor "β" defined in Equation 6.

$$M_{limit} = (1-\beta+\gamma\beta)M_{EGR} + \gamma M_{H_2O,air} + M_{fuel} + M_{air} \quad \text{(Equation 10)}$$

It is possible to obtain the EGR gas mass at the combustion stabilization limitation from Equation 11 if the effective gas mass $M_{limit}$ at the combustion stabilization limitation has the existing value from Equation 10.

$$M_{EGR} = \frac{M_{limit} - \gamma M_{H_2O,air} - M_{fuel} - M_{air}}{1 - \beta + \gamma\beta} \quad \text{(Equation 11)}$$

Here, if the factor $M_{limit}$ is substituted with the factor $M_{max,map}$, the right side of Equation 11 has the existing value, and the target exhaust gas amount can be determined.

$$M_{EGR} = \frac{M_{max,map} - \gamma M_{H_2O,air} - M_{fuel} - M_{air}}{1 - \beta + \gamma\beta} \quad \text{(Equation 12)}$$

Note that the factor "γ" is determined through an engine test or a simulation test such as numerical simulation in advance. The factor "γ" is set to 1 to 2 in many cases, but is not limited thereto.

From Equation 12, the target exhaust gas amount is set on the basis of the following equation by assuming that water and carbon dioxide have the same responsiveness.

$$M_{EGR} = M_{max,map} - \gamma M_{H_2O,air} - M_{fuel} - M_{air} \quad \text{(Equation 13)}$$

By setting the target exhaust gas amount in this manner, it is possible to significantly reduce fuel consumption by maximizing the EGR amount depending on a change of humidity while maintaining stable combustion.

From the relationship described above, in the case of "γ=1," the EGR amount is determined by computing the moisture amount $M_{H2O, air}$ introduced from the fresh air and the moisture amount β introduced from the exhaust gas. Therefore, it is possible to control the EGR amount depending on the moisture amount. Accordingly, it is possible to set the EGR amount depending on the moisture amount in the cylinder. As a result, the control can be performed such that reduction of the fuel consumption can be maximized depending on the humidity of the air.

In the case of "γ>1," it is possible to consider a change of the stable combustion limitation mass caused by a change of the moisture amount by computing the moisture amount $M_{H2O, air}$ introduced from the fresh air and the moisture amount β introduced from the exhaust gas. As a result, it is possible to avoid an excessive EGR amount and suppress destabilization of the combustion stability to the minimum. Meanwhile, it is possible to perform control such that reduction of the fuel consumption caused by reduction of the intake air negative pressure is maximized.

An optimum definition of the combustion stabilization limitation mass $M_{max, map}$ of FIG. 3 will now be described. It is desirable to determine the combustion stabilization limitation mass at the ambient temperature Tamb and the relative humidity of 100% as described above to avoid combustion instability. In this case, assuming that "$M_{H2O, air, 100\%}$" denotes the water mass in the air having a humidity of 100%, the combustion stabilization limitation mass $M_{max, map}$ has the following relationship of Equation 12.

$$M_{max,map} = (1-\beta+\gamma\beta)M_{EGR} + \gamma M_{H_2O,air,100\%} + M_{fuel} + M_{air} \quad \text{(Equation 14)}$$

From this equation, the map of FIG. 3 showing the combustion stabilization limitation mass $M_{max, map}$ desirably has a value obtained by computing the right side of Equation 12.

Figure 8:
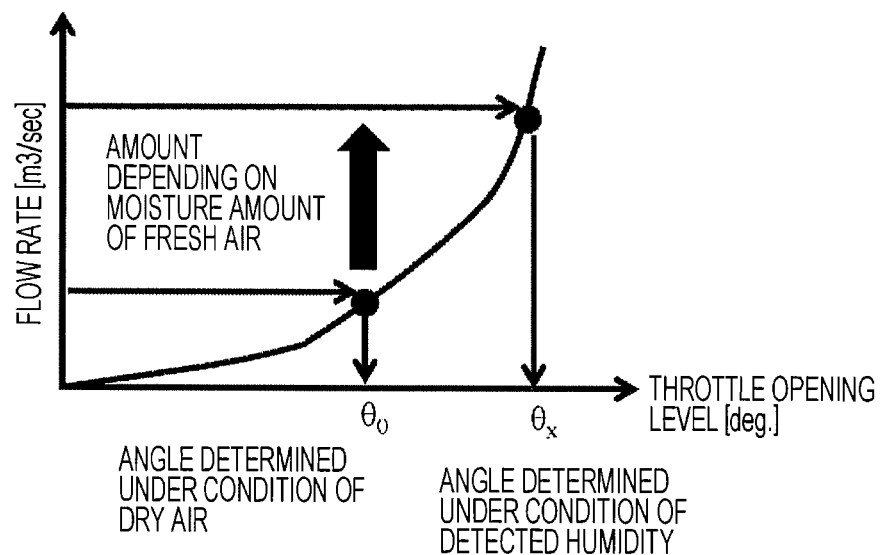
FIG. 8 is a conceptual diagram illustrating a humidity-based control for a throttle valve opening level.

Then, in step S605, influence from the moisture amount in the fresh air and influence from the recirculating EGR gas amount are corrected, and a throttle opening level necessary to introduce the required air amount is computed. A map representing a relationship between the flow rate and the throttle opening level is prepared in the ECU in advance as illustrated in FIG. 8, and the throttle opening level is computed from this relationship. However, the required air amount is introduced into the cylinder by controlling the throttle opening level considering that the moisture of the air caused by humidity or the EGR gas amount is mixed.

Figure 9:
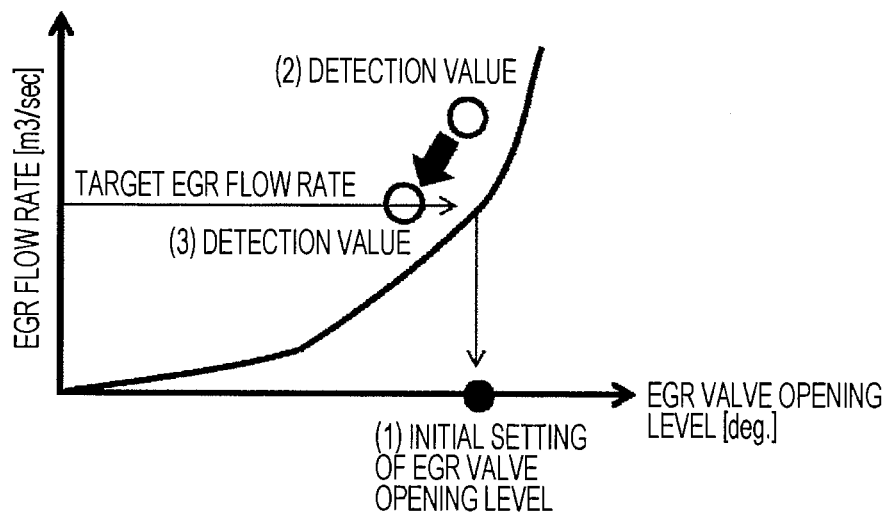
FIG. 9 is a conceptual diagram illustrating a humidity-based control for an EGR valve opening level.

Then, in step S606, the EGR valve opening level is set on the basis of a relationship between the EGR valve opening level and the EGR flow rate as illustrated in FIG. 9. First, the EGR valve opening level is set from the map data of FIG. 9 depending on the target exhaust gas amount. If a difference is generated between the detection value detected in Equation 15 and the target value, the valve opening level is set to increase or decrease depending on the difference of the detection value.

$$m_{EGR} = \frac{P_a \times A \times C \sqrt{\frac{2 \times \Delta P_{EGR}}{\rho}}}{R_{EGR} T_{EGR}}$$ (Equation 15)

If the detection value is larger than the target value, the EGR valve opening level is controlled to decrease. In contrast, if the detection value is smaller than the target value, the EGR valve opening level is controlled to increase. Here, "$T_{EGR}$" denotes an EGR gas temperature measured using an EGR gas temperature sensor (not illustrated in FIG. 5) or an estimated value of the EGR gas temperature estimated from the water temperature.

Then, in step S607, the control is performed on the basis of the throttle opening level obtained in step S605.

Then, in step S608, the EGR value is controlled on the basis of the EGR valve opening level set in step S606.

The engine is controlled through the aforementioned step.

Figure 7:
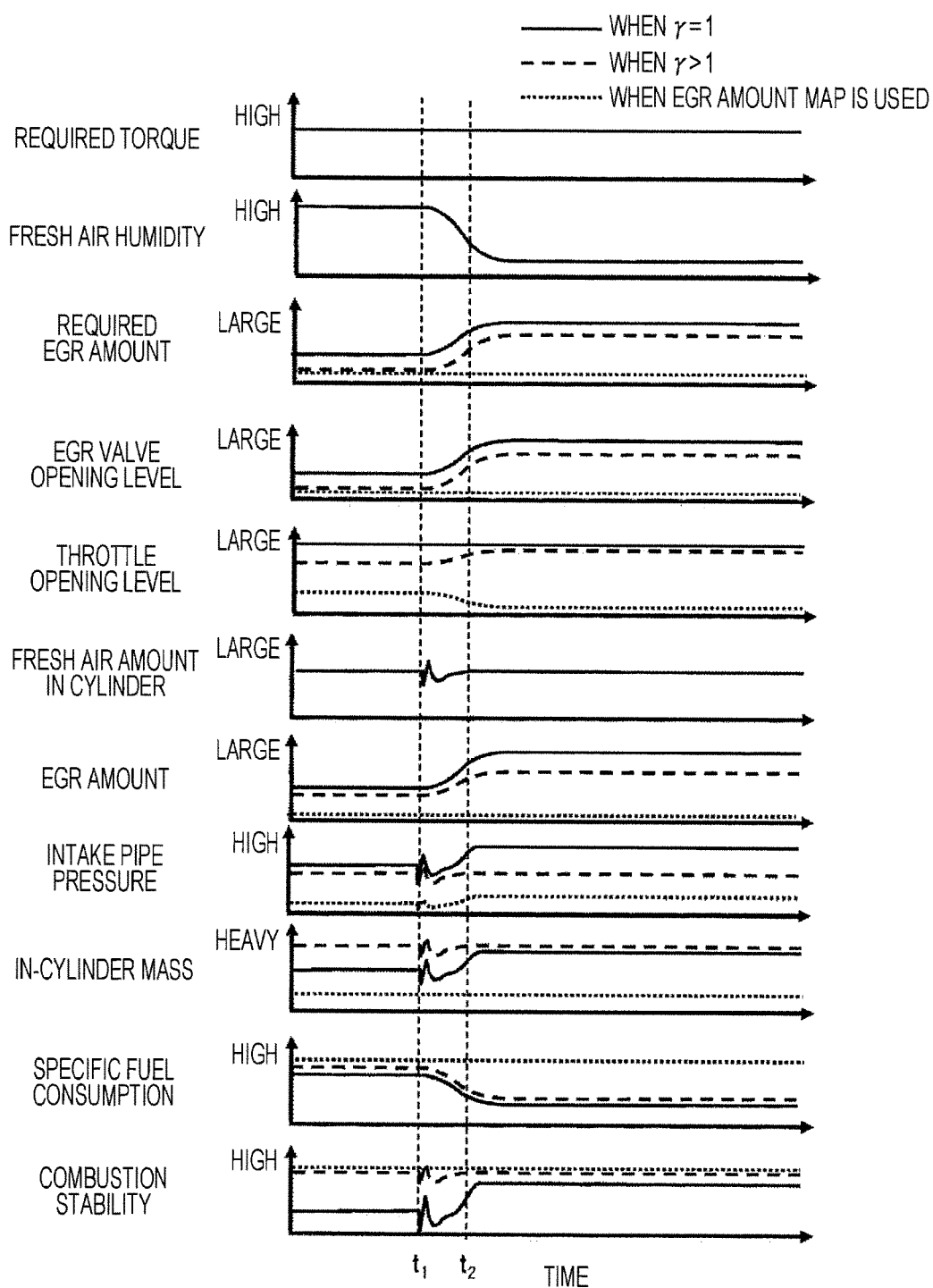
FIG. 7 is a timing chart illustrating various changes in an actuator or a measurement value when the engine control device according to Example 1 is employed.

FIG. 7 illustrates operations of each actuator and a change of detection value when the control of FIG. 6 is performed. In FIG. 7, it is assumed that the external humidity condition is changed, and the required torque is constant. Then, it is assumed that the external air humidity starts to decrease from the timing t1, and a change of the detection value is removed at the timing t2. In this case, there is no change in the stable combustion limitation mass computed in step S603 of FIG. 6. Subsequently, since the humidity is reduced at and after the timing t1, the target exhaust gas amount computed in step S605 of FIG. 6 increases at and after the timing t1. As a result, the setting value of the EGR valve opening level also gradually increases from the timing t1 to the timing t2. Assuming that "γ=1," the overall gas amount does not change, and thus, the throttle opening level may not nearly change. As a result, the air amount introduced into the cylinder is maintained constant. Assuming that "γ>1," the gas amount introduced into the cylinder (the mass in the cylinder) increases as the humidity decreases. Therefore, in step S605, the throttle valve opening level is set to be larger than the value of the timing t1. As a result, the throttle valve opening level increases, and the air amount introduced into the cylinder is controlled to be constant. As a result of this control, the amount of the introduced exhaust gas increases as the external air humidity increases. This is because the EGR amount is corrected by considering the moisture amount through the computation of step S605. As a result, in both cases of "γ=1" and "γ>1," it is possible to increase the intake pipe pressure, compared to a case where the moisture amount is not corrected (a case where the EGR amount map is used). As a result, it is possible to reduce the specific fuel consumption as well. In addition, in the case of "γ=1," the combustion stability tends to decrease. As a result, in the case of "γ<1," it is possible to increase the specific fuel consumption.

EXAMPLE 2

Figure 10:
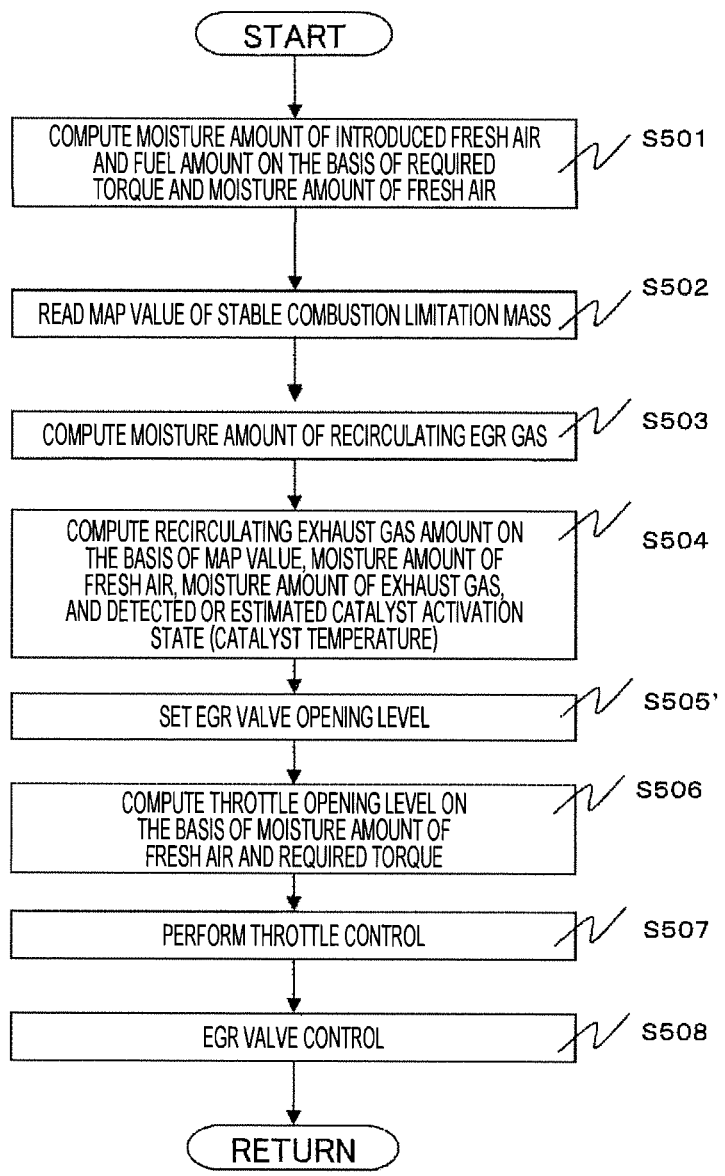
FIG. 10 is a flowchart illustrating a moisture amount-based EGR amount control of the engine control device according to Example 2.

Next, Example 2 will be described. FIG. 5 illustrates the engine configuration, and FIG. 2 illustrates the ECU configuration. FIG. 10 illustrates a computation process performed by the EGR valve control unit of FIG. 2. Example 2 is similar to Example 1 except for the process of step S1004. When the target exhaust gas amount is set in step S1004, the catalyst temperature is estimated depending on an increase of the coolant temperature measured using the coolant temperature sensor or the time from the engine start. In addition, the target exhaust gas amount is set depending on the estimated catalyst activation state. In the low-pressure EGR system, the exhaust gas prior to activation of the catalyst contains a lot of active chemical species contributing to the combustion stability, such as carbon monoxide (CO) or nitrogen monoxide (NO), compared to the catalyst warm-up steady state. In the steady state posterior to the warm-up, such active chemical species are converted into stable chemical species such as carbon dioxide, water, and nitrogen through oxidation or reduction reactions of the catalyst. For this reason, compared to the steady state posterior to the warm-up, the stable combustion limitation mass prior to the warm-up is heavy. The stable combustion limitation mass $M_{max, map}$ defined in FIG. 3 is determined using the steady state posterior to the warm-up. For this reason, due to the influence of the chemical species prior to the warm-up containing a lot of active chemical species, combustion is not unstable even when the EGR gas more than the target exhaust gas amount determined from the stable combustion limitation mass $M_{max, map}$ is introduced. In this regard, if it is determined that the catalyst is not activated, the target exhaust gas amount is determined using the following equation in step S1004.

$$M_{EGR} = \frac{M_{max,map} - \gamma M_{H_2O,air} - M_{fuel} - M_{air}}{1 - \beta + \gamma \beta} + \Delta M_{Rad}$$ (Equation 16)

Figure 11:
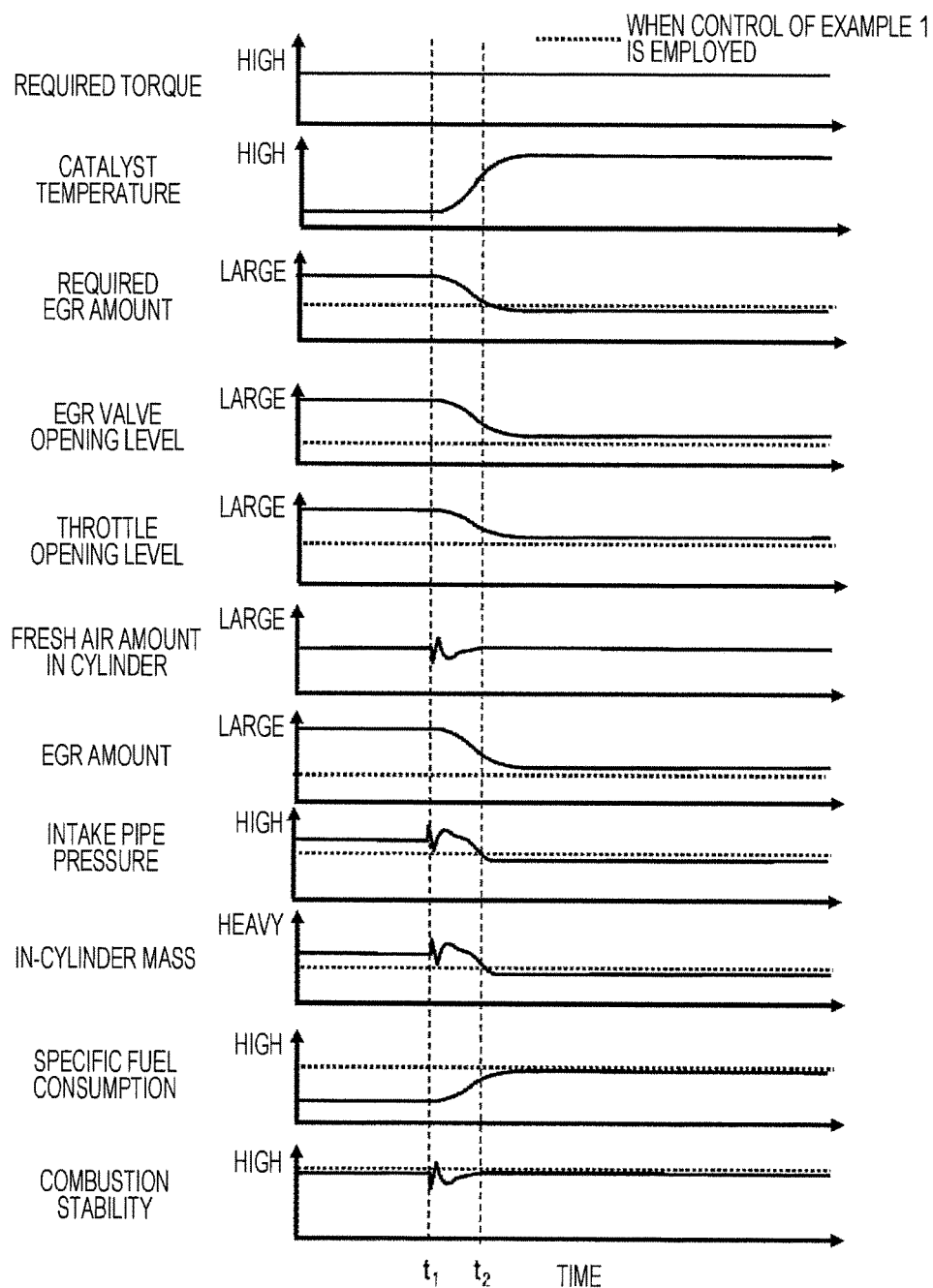
FIG. 11 is a timing chart illustrating various changes in an actuator or a measurement value when the engine control device according to Example 2 is employed.

Here, "$\Delta M_{Rad}$" denotes a correction factor for considering the influence of the active chemical species. In the case of the low-pressure EGR system, the factor "$\Delta M_{Rad}$" changes depending on catalyst activity. Under the catalyst inactivation state, carbon monoxide (CO) or nitrogen dioxide (NO) generated by combustion remains without being converted. Therefore, the factor "$\Delta M_{Rad}$" has a large value. As the catalyst is activated, the factor "$\Delta M_{Rad}$" becomes zero. The target exhaust gas amount can be appropriately changed by changing the factor "$\Delta M_{Rad}$" on the basis of the catalyst activity detected by the water temperature and the time elapsing from the engine start. The change of the factor "$\Delta M_{Rad}$" relative to the catalyst activity is investigated through an engine test in advance, and the data is stored in the ECU. FIG. 11 illustrates operations of the actuator when the control of FIG. 10 is performed. It is assumed that the catalyst temperature estimated on the basis of the coolant temperature and the time elapsing from the engine start is changed, and the required torque is constant. It is assumed that the detected catalyst temperature starts to increase from the timing t1 and rises to the temperature of the timing t2 at which the catalyst is activated. In this case, the map value of the stable combustion limitation mass computed in step S1003 of FIG. 10 does not temporally change. Meanwhile, the target exhaust gas amount computed in step S1005 of FIG. 10 decreases from the timing t1 to the timing t2. This is because the target exhaust gas amount of Equation 16 is corrected on the basis of the detected catalyst activation state (catalyst temperature). For this reason, the value is set such that the target exhaust gas amount is reduced as the catalyst temperature increases from the timing t1 to the timing t2. As a result, the setting value of the EGR valve opening level is set to gradually decrease from the timing t1 to the timing t2. Although the required torque does not change, the target exhaust gas amount is reduced. Therefore, in step S1005, the throttle valve opening level is set to smaller than that of the timing t1 as the target exhaust gas amount is reduced. As a result, the control is performed such that the throttle valve opening level decreases, and the air amount introduced into the cylinder becomes constant. As a result of this control the introduced exhaust gas amount changes to decrease as the catalyst temperature increases. Consequently, it is possible to set the target exhaust gas amount by reflecting the amount of the active chemical species that changes depending on the activation state of the catalyst. Therefore, in engines provided with the low-pressure EGR system, it is possible to implement more remarkable reduction of the fuel consumption if the catalyst does not have the active state.

As a result, it is possible to maximize the fuel consumption reduction amount prior to activation of the catalyst while avoiding combustion instability depending on the catalyst activation state when the low-pressure EGR system is employed.

EXAMPLE 3

Figure 12:
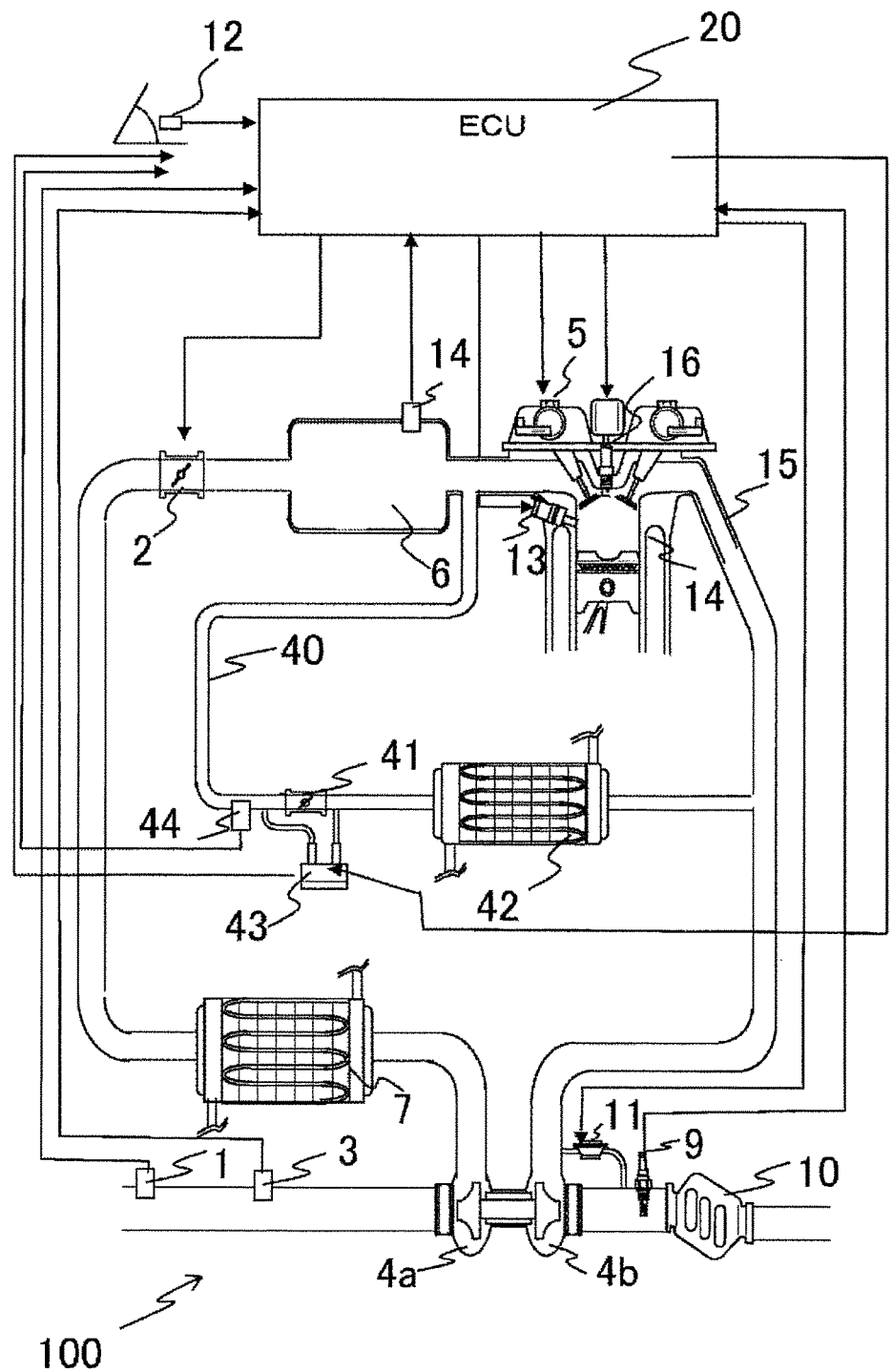
FIG. 12 is a schematic system diagram illustrating an engine control device according to Example 3.
Figure 13:
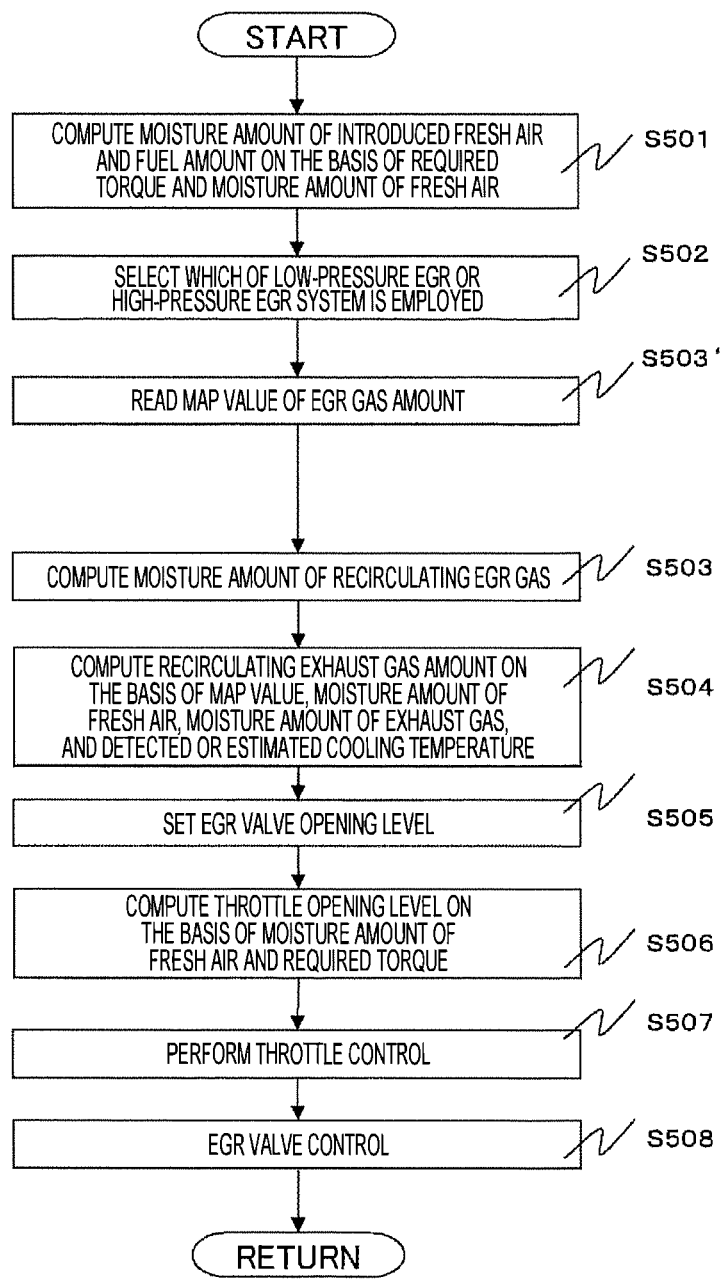
FIG. 13 is a flowchart illustrating a moisture amount-based EGR amount control of the engine control device according to Example 3.

Next, Example 3 will be described. With regard to Example 3, FIG. 12 illustrates a configuration of the engine, and FIG. 13 illustrates a computation process performed by the EGR valve control unit of FIG. 2. The configuration of the engine of FIG. 12 is similar to that of FIG. 5 except for the exhaust gas recirculation mechanism. In the configuration of FIG. 12, the exhaust gas is extracted from the upstream side of the turbine of the turbocharger and is recirculated to the downstream side of the compressor. The computation process of FIG. 13 is similar to that of Example 1 of FIG. 6 except for step S1304. In step S1304, when the target exhaust gas amount is set, the coolant temperature measured using the coolant temperature sensor or the target exhaust gas amount depending on the detected EGR gas temperature are set. While the coolant temperature is low, the EGR gas temperature is lowered. If the temperature decreases, unstable combustion easily occurs. Therefore, compared to a case where the EGR gas temperature is high, the stable combustion limitation mass is reduced. In this regard, setting of the target exhaust gas amount using Equation 17 is performed.

$$M_{EGR} = \frac{M_{max,map} - \gamma M_{H_2O,air} - M_{fuel} - M_{air}}{1 - \beta + \gamma\beta} + \Delta M_T \quad \text{(Equation 17)}$$

Here, $\Delta M_T$ denotes a correction factor for considering the exhaust gas temperature.

In the case of the high-pressure EGR system, the temperature of the exhaust gas introduced into the engine cylinder is different depending on the coolant temperature. Specifically, immediately after the engine start, the coolant temperature is low. Therefore, the exhaust gas temperature is lowered relative to the temperature of the warm-up steady state. After sufficient time elapses from the engine start, the exhaust gas temperature reaches the warm-up steady state temperature (higher than the engine start temperature). As described above, if the recirculating exhaust gas temperature decreases, the temperature of the gas mixture is lowered, and unstable combustion easily occurs. For this reason, the correction depending on the EGR gas temperature is effective in order to stabilize combustion while maximizing reduction of the fuel consumption. The stable combustion limitation mass $M_{max,\ map}$ defined in FIG. 3 is determined depending on the steady state after the warm-up. Therefore, the value of "$\Delta M_T$" is set to be equal to or smaller than zero. That is, if the water temperature or the EGR gas temperature is low, the target exhaust gas amount is set to be smaller than the EGR amount computed from the stable combustion limitation gas mass $M_{max,\ map}$. If the water temperature sufficiently increases, or the EGR gas temperature sufficiently increases, the value of "$\Delta M_T$" is set to zero, the same amount as the EGR amount computed from the stable combustion limitation gas mass set depending on a reference condition is set to the target exhaust gas amount. A change of "$\Delta M_T$" with respect to the water temperature or the EGR gas temperature is investigated through an engine test in advance, and the resulting data is stored in the ECU.

Figure 14:
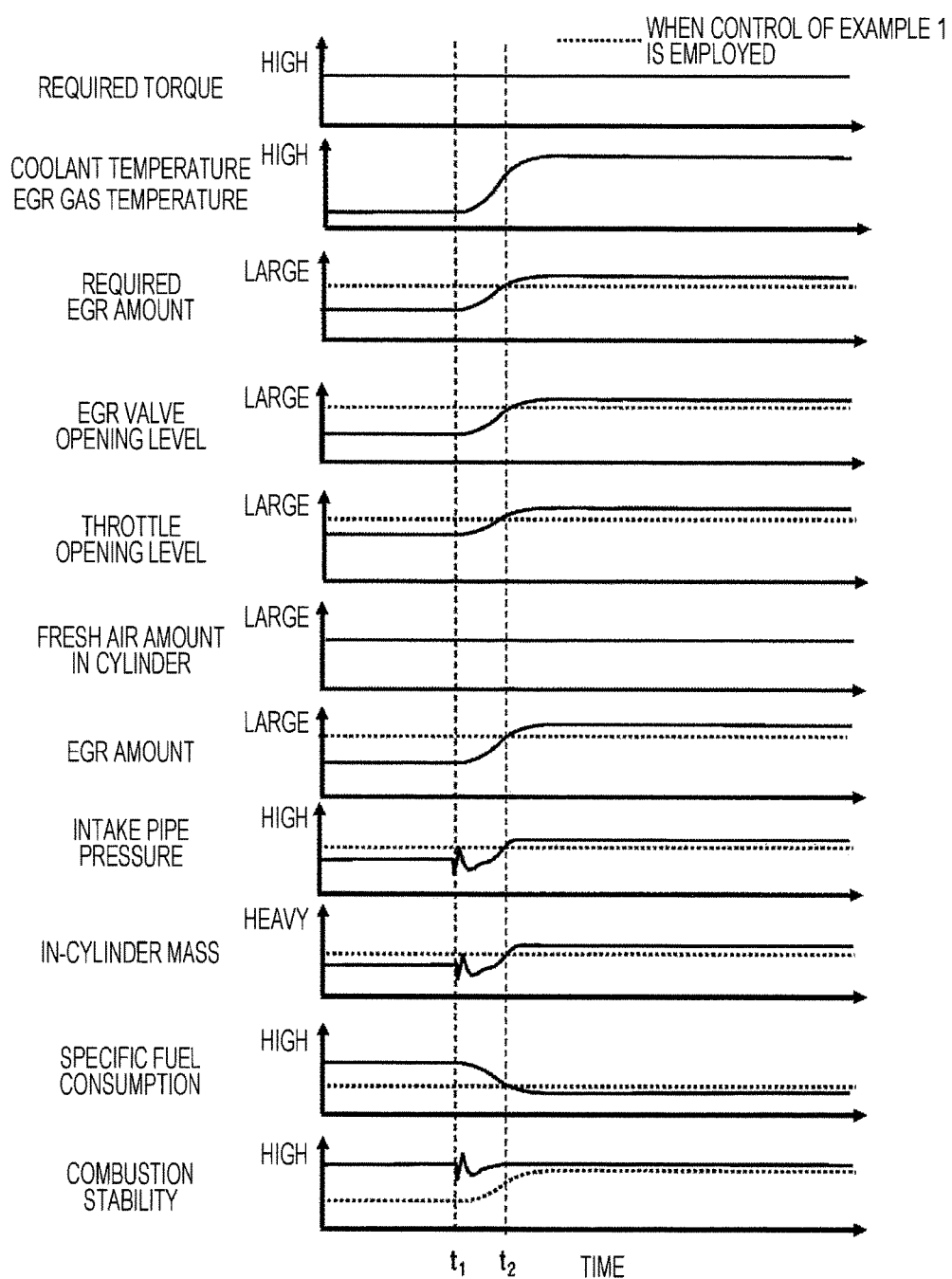
FIG. 14 is a timing chart illustrating various changes in an actuator or a measurement value when an engine control device according to Example 4 is employed.

FIG. 14 illustrates various operations of the actuator when the processing is performed along the control flowchart of FIG. 13. It is assumed that the required torque is constant. It is assumed that the coolant temperature detected from the coolant temperature sensor during driving or the EGR gas temperature detected from the EGR temperature sensor 44 starts to increase from the timing t1 and reaches the steady state at the timing t2. In this case, the value of the stable combustion limitation mass computed in step S1303 of FIG. 13 does not temporally change. However, the target exhaust gas amount computed in step S1305 of FIG. 13 gradually increases from the timing t1 to the timing t2 in order to compute the target exhaust gas amount using Equation 17 on the basis of the coolant temperature or the exhaust gas temperature. For this reason, as the coolant temperature or the exhaust gas temperature increases from the timing t1 to the timing t2, the target exhaust gas amount, and the coolant temperature or the exhaust gas temperature gradually increase. As a result, the setting value of the EGR valve opening level is set to gradually increase from the timing t1 to the timing t2. Although the required torque does not change, the target exhaust gas amount increases. Therefore, in step S1305, the throttle valve opening level is set to be larger than that of the timing t1 as the target exhaust gas amount decreases in step S1305. As a result, the control is performed such that the throttle valve opening level increases, and the air amount introduced into the cylinder becomes constant. As a result of this control, the introduced exhaust gas amount is changed to increase as the coolant temperature or the exhaust gas temperature increases. As a result, it is possible to avoid degradation of combustion stability when the coolant temperature or the exhaust gas temperature is low. If the combustion is unstable, the fuel consumption performance is also degraded. Therefore, it is possible to reduce the specific fuel consumption, compared to the control discussed in Example 1.

As described above, it is possible to maximize reduction of the fuel consumption while avoiding combustion instability under a low coolant or EGR gas temperature condition when the high-pressure EGR system is employed.

EXAMPLE 4

Figure 15:
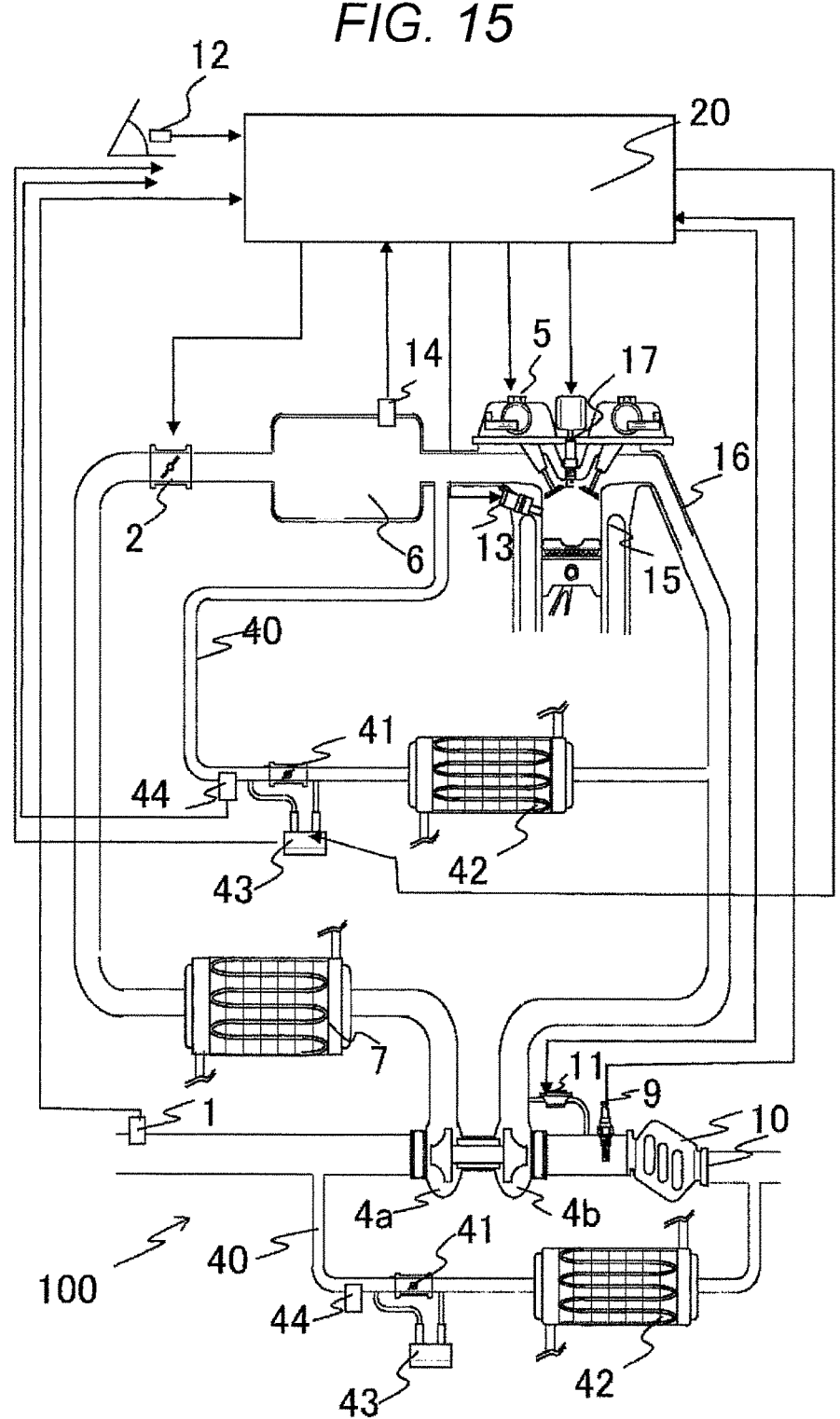
FIG. 15 is a schematic system diagram illustrating an engine control device according to Example 4.
Figure 16:
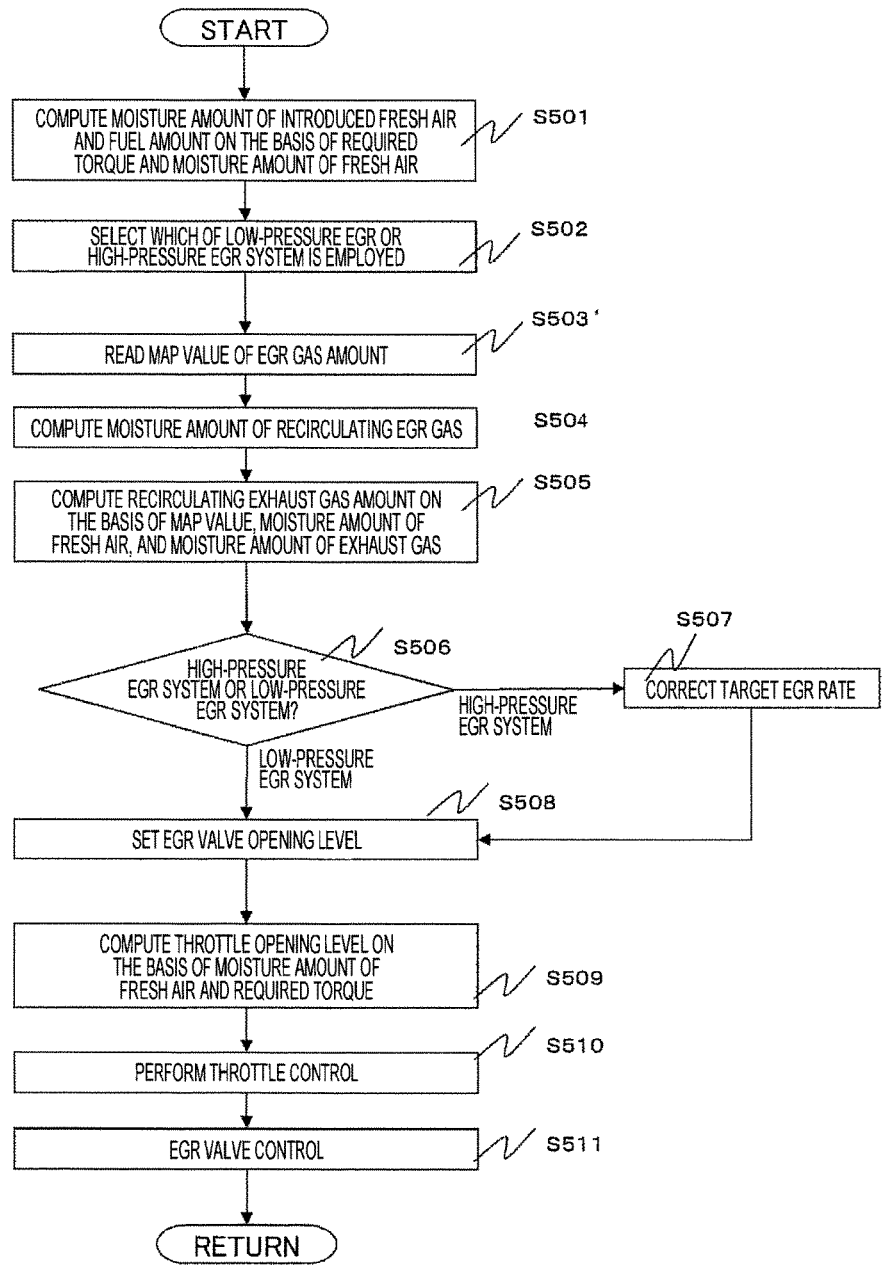
FIG. 16 is a flowchart illustrating a moisture amount-based EGR amount control of the engine control device according to Example 4.

Next, Example 4 will be described. FIG. 15 illustrates a configuration of the engine, and FIG. 16 illustrates a computation process performed by the EGR valve control unit of FIG. 2. The configuration of FIG. 15 is similar to that of FIG. 5 except for the exhaust gas recirculation mechanism. In the configuration of FIG. 15, the configuration of FIG. 5 is combined with a mechanism for extracting the exhaust gas from the upstream side of the turbine of the turbocharger and recirculating the exhaust gas to the downstream side of the compressor. The computation process of FIG. 16 is similar to that of Example 1 of FIG. 6 except for steps S1609 and S1610 of FIG. 16. In step S1609, it is determined whether the recirculating exhaust gas is applied to the high-pressure EGR system or the low-pressure EGR system. For example, if the required torque is abruptly changed, and high responsiveness of the exhaust gas is necessary, it is determined that the high-pressure exhaust gas is employed. If it is difficult to recirculate the necessary exhaust gas in the high-pressure EGR system under a supercharging condition, the low-pressure EGR system is employed. In other cases, the EGR system may be determined depending on the water temperature, the time elapsing from the engine start, or the catalyst activation status. If the high-pressure EGR system is selected in step S1609, the process advances to step S1610. In step S1610, the target exhaust gas amount is changed to the target exhaust gas amount using Equation 18.

$$M_{EGR} = \frac{M_{max,map} - \gamma M_{H_2O,air} - M_{fuel} - M_{air}}{1 - \beta + \gamma\beta} + \Delta M_{high} \quad \text{(Equation 18)}$$

Here, "$\Delta M_{high}$" denotes the correction factor when the high-pressure EGR system is employed. In the case of the high-pressure EGR system, the exhaust gas is returned to the intake side without passing through the catalyst. Therefore, the exhaust gas contains a lot of active chemical species such as carbon monoxide or nitrogen oxide. Meanwhile, in the case of the low-pressure EGR system, the exhaust gas passes through the catalyst and is then returned to the intake side. Therefore, there are little active chemical species in most cases, and there are stable chemical species. Since the active chemical species act to accelerate the combustion rate, the stable combustion limitation mass increases when there are many active chemical species, compared to the case of the stable chemical species. For this reason, it may be possible to recirculate more exhaust gas. It is necessary to determine the factor "$\Delta M_{high}$" in advance through an engine test. In this example, it is assumed that the stable combustion mass limitation $M_{max}$, map in the warm-up steady state is determined in the case of the low-pressure EGR system, and the factor "$\Delta M_{high}$" is then determined. In this case, the factor "$\Delta M_{high}$" has a positive value. That is, in the case of the high-pressure EGR system, it is possible to set the larger target exhaust gas amount, compared to the case of the low-pressure EGR system. Here, the difference "$\Delta M_{high}$" of the EGR amount that can be recirculated is investigated in advance through an engine test individually for the case of the low-pressure EGR system and for the case of the high-pressure EGR system, and the resulting data are stored in the ECU.

Figure 17:
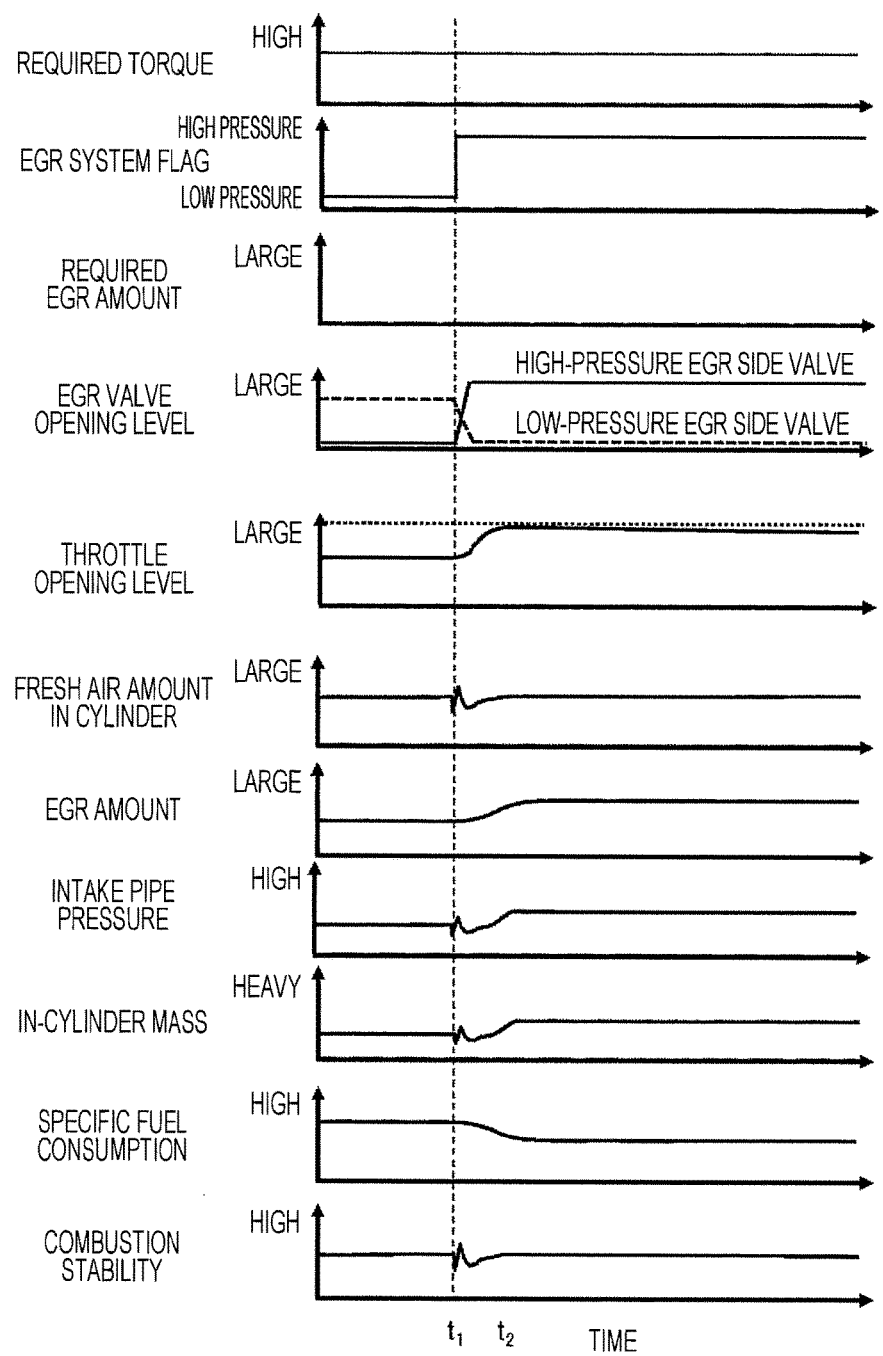
FIG. 17 is a timing chart illustrating various changes in an actuator or a measurement value when the engine control device according to Example 4 is employed.

FIG. 17 illustrates various operations of the actuator when the computation process of FIG. 16 is performed. It is assumed that the required torque is constant. It is assumed that the high-pressure EGR system is employed in step S1609 of the flowchart at the timing t1. In this case, there is no change in the map value of the stable combustion limitation mass read in step S1603 of FIG. 15. However, at and after the timing t1, the target exhaust gas amount is changed in step S1610 of FIG. 15, and thus, the target exhaust gas amount increases. As a result, the EGR valve opening level also increases at and after the timing t1. Although the required torque does not change, the target exhaust gas amount increases. Therefore, in step S1605, the throttle valve opening level is set to be larger than that of the timing t1 as the target exhaust gas amount increases. As a result, the control is performed such that the throttle valve opening level increases, and the air amount introduced into the cylinder becomes constant. As a result of this control, the introduced exhaust gas amount is larger when the high-pressure EGR system is employed, compared to a case where the low-pressure EGR system is employed. In the case of Example 4, the EGR amount introduced when the EGR system is switched to the high-pressure EGR increases. Therefore, the pumping loss is reduced, and accordingly, the fuel consumption is reduced.

Consequently, it is possible to suitably set the EGR amount depending on the low-pressure EGR system and the high-pressure EGR system while securing combustion stability. Therefore, it is possible to maximize fuel consumption performance while avoiding degradation of combustion stability when switching to each system.

REFERENCE SIGNS LIST 1 air flow sensor
2 electronic control throttle
3 humidity sensor
4 supercharger
4a compressor
4b turbine
5 variable valve
6 intake manifold
7 intercooler
9 air/fuel ratio sensor
10 three-way catalyst
11 wastegate valve
12 accelerator opening level sensor
13 cylinder direct injection injector
14 cylinder
15 exhaust pipe
16 ignition plug
20 ECU
20a input circuit
20b input/output port
20c RAM
20d ROM
20e CPU
20f electronic control throttle driving circuit
20g injector driving circuit
20h wastegate valve driving circuit
20j intercooler coolant valve driving circuit
20k transmission driving circuit
20m EGR valve driving circuit
30 transmission 40 EGR pipe
41 EGR valve
42 EGR cooler
43 differential pressure sensor
44 EGR temperature sensor
100 engine

The invention claimed is:

1. An internal combustion engine control device that controls an internal combustion engine provided with a cylinder and an EGR mechanism configured to return an exhaust gas discharged from the cylinder to an intake side of the cylinder, the internal combustion engine control device comprising:
    an EGR control unit configured to control an EGR flow rate of the EGR mechanism; and
    a humidity detection unit configured to directly or indirectly detect humidity of an ambient air supplied to the cylinder,
    wherein the EGR control unit is further configured to:
        compute a moisture amount of the ambient air and a moisture amount of the recirculating exhaust gas; and
        control the EGR mechanism based on (i) a stable combustion limitation cylinder mass which is set depending on a combustion state of the cylinder, (ii) a mass of the air introduced into the cylinder, (iii) a mass of fuel, (iv) the moisture amount of the ambient air, and (v) the moisture amount of the recirculating exhaust gas.

2. The internal combustion engine control device according to claim 1, wherein the humidity detection unit comprises a humidity sensor which is configured to directly detect the humidity of the ambient air supplied to the cylinder.

3. The internal combustion engine control device according to claim 1, wherein the stable combustion limitation cylinder mass is changed depending on the moisture amount suctioned to the cylinder.

4. An internal combustion engine control device that controls an internal combustion engine provided with a cylinder and an EGR mechanism configured to return an exhaust gas discharged from the cylinder to an intake side of the cylinder, the internal combustion engine control device comprising:
    an EGR control unit configured to control an EGR flow rate of the EGR mechanism; and
    a humidity detection unit configured to directly or indirectly detect humidity of an ambient air supplied to the cylinder,
    wherein the EGR control unit computes a moisture amount of the ambient air and a moisture amount of the recirculating exhaust gas and controls the EGR mechanism on the basis of a stable combustion limitation cylinder mass set depending on a combustion state of the cylinder, a mass of the air introduced into the cylinder, a mass of fuel, the moisture amount of the ambient air, and the moisture amount of the recirculating exhaust gas, and
    wherein the internal combustion engine has a coolant temperature detection unit configured to detect a coolant temperature, a supercharger comprising a compressor and a turbine, and a catalyst placed in a downstream side of the turbine of the supercharger,
    the EGR mechanism is a mechanism that returns the exhaust gas from an outlet port of a downstream side of the catalyst to an inlet port in an upstream side of the compressor of the supercharger, and
    the EGR control unit controls the EGR mechanism such that the exhaust gas amount returning to the intake side of the cylinder increases if it is determined that the catalyst does not have an active state on the basis of the coolant temperature detected by the cooling temperature detection unit.

5. An internal combustion engine control device that controls an internal combustion engine provided with a cylinder and an EGR mechanism configured to return an exhaust gas discharged from the cylinder to an intake side of the cylinder, the internal combustion engine control device comprising:
    an EGR control unit configured to control an EGR flow rate of the EGR mechanism; and
    a humidity detection unit configured to directly or indirectly detect humidity of an ambient air supplied to the cylinder,
    wherein the EGR control unit computes a moisture amount of the ambient air and a moisture amount of the recirculating exhaust gas and controls the EGR mechanism on the basis of a stable combustion limitation cylinder mass set depending on a combustion state of the cylinder, a mass of the air introduced into the cylinder, a mass of fuel, the moisture amount of the ambient air, and the moisture amount of the recirculating exhaust gas, and
    wherein the internal combustion engine has a coolant temperature detection unit that detects a coolant temperature and a supercharger comprising a compressor and a turbine,
    the EGR mechanism is a mechanism that returns the exhaust gas from an outlet port of an upstream side of the turbine of the supercharger to an inlet port of a downstream side of the compressor of the supercharger, and
    the EGR control unit increases the stable combustion limitation cylinder mass as the coolant temperature detected by the cooling temperature detection unit increases and controls the exhaust gas amount returning to the intake side of the cylinder on the basis of an updated stable combustion limitation cylinder mass.

6. The internal combustion engine control device according to claim 1, wherein the internal combustion engine has a supercharger comprising a compressor and a turbine, and a catalyst placed in a downstream side of the turbine of the supercharger,
    the EGR mechanism has a high-pressure EGR mechanism configured to return the exhaust gas from an outlet port in an upstream side of the turbine of the supercharger to an inlet port in a downstream side of the compressor of the supercharger and a low-pressure EGR mechanism configured to return the exhaust gas from the outlet port in a downstream side of the catalyst to the inlet port in an upstream side of the compressor of the supercharger, and
    the EGR control unit sets the stable combustion limitation cylinder mass to be large when the exhaust gas is returned to the intake side of the cylinder using the high-pressure EGR mechanism, compared to a case where the exhaust gas is recirculated using the low-pressure EGR mechanism and controls the exhaust gas amount returning to the intake side of the cylinder on the basis of an updated stable combustion limitation mass.

7. The internal combustion engine control device according to claim 1, wherein the internal combustion engine has a coolant temperature detection unit configured to detect a coolant temperature, a supercharger comprising a compressor and a turbine, and a catalyst placed in a downstream side of the turbine of the supercharger, the EGR mechanism is a mechanism that returns the exhaust gas from an outlet port of a downstream side of the catalyst to an inlet port in an upstream side of the compressor of the supercharger, and the EGR control unit controls the EGR mechanism such that the exhaust gas amount returning to the intake side of the cylinder increases if it is determined that the catalyst does not have an active state on the basis of the coolant temperature detected by the cooling temperature detection unit.

8. The internal combustion engine control device according to claim 1, wherein the internal combustion engine has a coolant temperature detection unit that detects a coolant temperature and a supercharger comprising a compressor and a turbine, the EGR mechanism is a mechanism that returns the exhaust gas from an outlet port of an upstream side of the turbine of the supercharger to an inlet port of a downstream side of the compressor of the supercharger, and the EGR control unit increases the stable combustion limitation cylinder mass as the coolant temperature detected by the cooling temperature detection unit increases and controls the exhaust gas amount returning to the intake side of the cylinder on the basis of an updated stable combustion limitation cylinder mass.

\* \* \* \* \*